(12) United States Patent
Galicia et al.

(10) Patent No.: US 7,766,406 B2
(45) Date of Patent: Aug. 3, 2010

(54) FINISHING PANEL STRUCTURE

(75) Inventors: Hiram Gaxiola Galicia, Farmington Hills, MI (US); David She, Farmington Hills, MI (US); Katsuyoshi Ota, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 152 days.

(21) Appl. No.: 12/270,894

(22) Filed: Nov. 14, 2008

(65) Prior Publication Data

US 2010/0123329 A1    May 20, 2010

(51) Int. Cl.
*B62C 99/00* (2009.01)
(52) U.S. Cl. .................... 296/1.09; 296/39.1
(58) Field of Classification Search ............. 296/1.08, 296/39.1, 187.11
See application file for complete search history.

(56) References Cited

U.S. PATENT DOCUMENTS

| RE33,200 E * | 4/1990 | Reynolds et al. ........... 296/39.1 |
| 5,887,931 A * | 3/1999 | Bills et al. ................. 296/39.1 |
| 6,886,874 B2 * | 5/2005 | Abe .......................... 296/1.08 |
| 7,066,374 B2 | 6/2006 | Tiesler et al. |
| 7,108,311 B2 | 9/2006 | Dooley et al. |

* cited by examiner

*Primary Examiner*—Lori L Lyjak
(74) *Attorney, Agent, or Firm*—Young Basile

(57) ABSTRACT

A finishing panel structure for an automobile comprising a trim panel, a deformable panel and a retainer bracket. The trim panel is connectable to the automobile and defines a panel opening. The deformable panel at least partially covers the panel opening, and defines a latch opening and at least one mounting apertures proximate to the latch opening. The retainer bracket defines a retainer bracket opening. At least one projection extends from at least one of the trim panel or the retainer bracket, and extends through the mounting aperture of the deformable panel. At least one engaging structure is formed on the other of the trim panel or the retainer bracket to engage the projection.

20 Claims, 5 Drawing Sheets

FINISHING PANEL STRUCTURE

FIELD OF THE INVENTION

The invention relates to interior trim panels for vehicles.

BACKGROUND

On certain interior panels for vehicles, it is known to partially cover an aperture through the panel using a deformable panel fabricated from a thin sheet material, such as rubber, where a slot or opening is formed through the deformable panel to allow a vehicle component to extend through the panel. For example, in the trunk of a passenger vehicle, it is known to provide a trim panel that is mounted on the upstanding rear interior surface of the trunk, below the trunk opening. An aperture is formed through the panel to allow a trunk mounted latch to pass through the aperture for engagement with a striker that is connected to the body of the vehicle behind the trim panel. By providing an enlarged opening through the trim panel, larger tolerances can be maintained without the potential for interference between the trim panel and the latch when the trunk is moved from an open position to a closed position. By providing the deformable panel to at least partially cover the aperture, a finished appearance is maintained. Additionally, in the event of a design change that slightly relocates the latch or the striker, modification of the trim panel may not be needed due to the enlarged opening, and a change to the deformable panel may be all that is required.

Conventionally, the deformable panel is attached to the trim panel by providing stakes on an internal surface of the trim panel and providing mounting holes through the deformable panel. The mounting holes of the deformable panel are placed over the mounting stakes, and the mounting stakes are melted, thus securing the deformable panel to the trim panel. In another conventional process, the deformable panel is attached to the internal surface of the trim panel by sonic welding.

SUMMARY

Finishing panel structures for automobiles are taught herein. According to one embodiment, a finishing panel structure comprises a trim panel, a deformable panel and a retainer bracket. The trim panel is connectable to the automobile and defines a panel opening. The deformable panel at least partially covers the panel opening, and defines a latch opening and at least one mounting aperture proximate to the latch opening. The retainer bracket defines a retainer bracket opening. At least one projection extends from at least one of the trim panel or the retainer bracket, and extends through the mounting aperture of the deformable panel. At least one engaging structure is formed on the other of the trim panel or die retainer bracket to engage the projection.

In certain embodiments of the invention, the projection and the engaging structure could resiliency engage one another to retain the deformable panel between the retainer bracket and the trim panel. Furthermore, the projection and the engaging structure could releasably connect the retainer bracket to the trim panel.

In other embodiments of the invention, the finishing panel structure could include at least one hook that extends from the trim panel, where the hook engages a first peripheral edge of the retainer bracket. Furthermore, the retainer bracket could include a second peripheral edge that is opposite the first peripheral edge, where either of the engaging structure or the projection is formed on the retainer bracket adjacent to the second peripheral edge.

In other embodiments of the invention, at least one alignment aperture is formed in the retainer bracket, and an alignment post extends from the trim panel, where the alignment post is configured and arranged to extend through the alignment aperture to align the retainer bracket with respect to the trim panel.

BRIEF DESCRIPTION OF THE DRAWINGS

The description herein makes reference to the accompanying drawings wherein like referenced numerals refer to like parts throughout the several views, and wherein.

DETAILED DESCRIPTION

Figure 1:
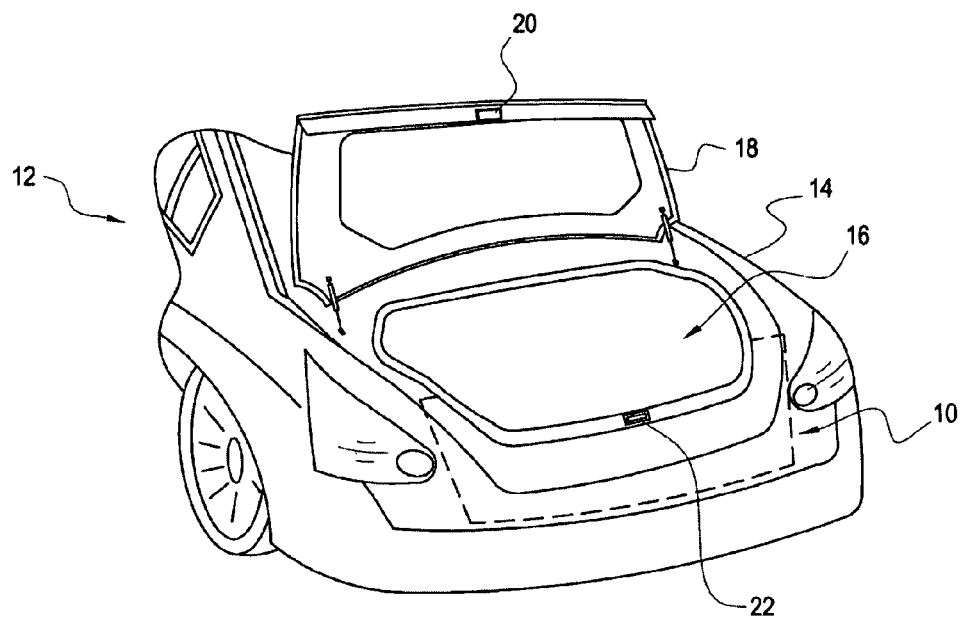
FIG. 1 is an illustration showing the finishing panel structure according to the invention installed in the trunk of an automobile.

FIG. 1 shows a finishing panel structure 10 installed in an automobile 12. The automobile 12 has a body 14 with a trunk opening 16 defined therein. A trunk lid 18 is pivotally connected to the body 14 of the automobile 12 for movement between an open position and a closed position. More particularly, a latch 20 is provided on the trunk lid 18, and a striker 22 is connected to the body 14 of the automobile 12. When the trunk lid 18 is in the open position, the latch 20 is spaced from the striker 22, and access is provided to the trunk opening 16. When the trunk lid 18 is in the closed position, the latch 20 is engaged with the striker 22, such that the trunk lid 18 blocks access to the trunk opening 16. As will be described in detail herein, the finishing panel structure 10 allows the latch 20 to pass through it when the trunk lid 18 is in die closed position, while concealing the striker 22 from view when the trunk lid 18 is in the open position to provide a more finished appearance to the automobile 12.

Figure 2:
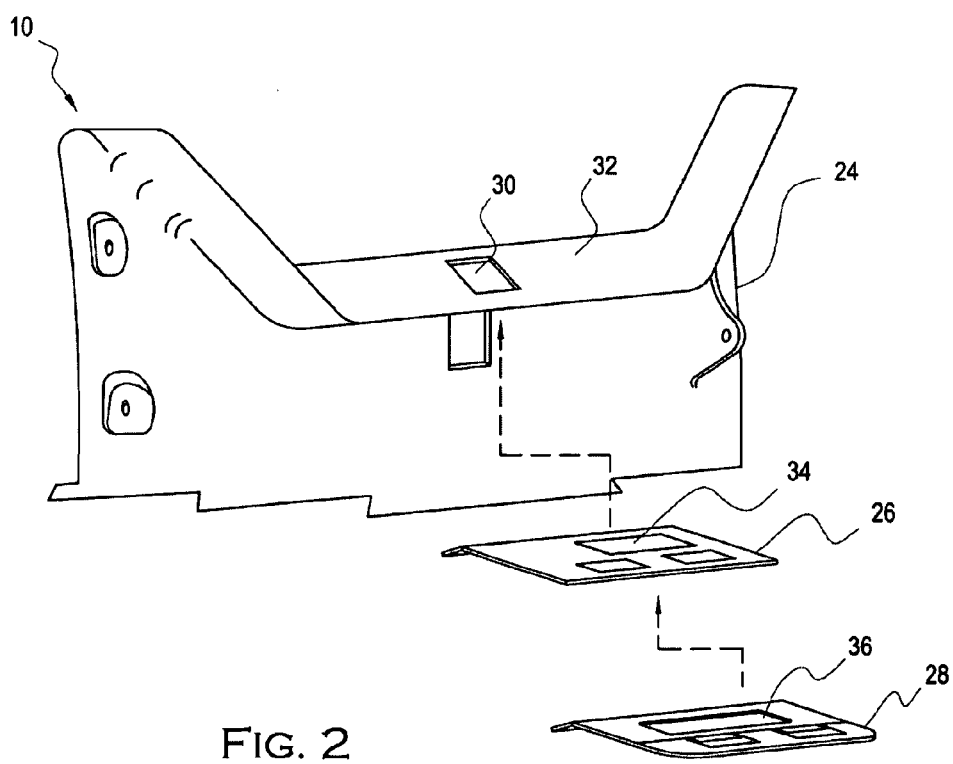
FIG. 2 is an exploded view showing the finishing panel structure of FIG. 1.
Figure 3:
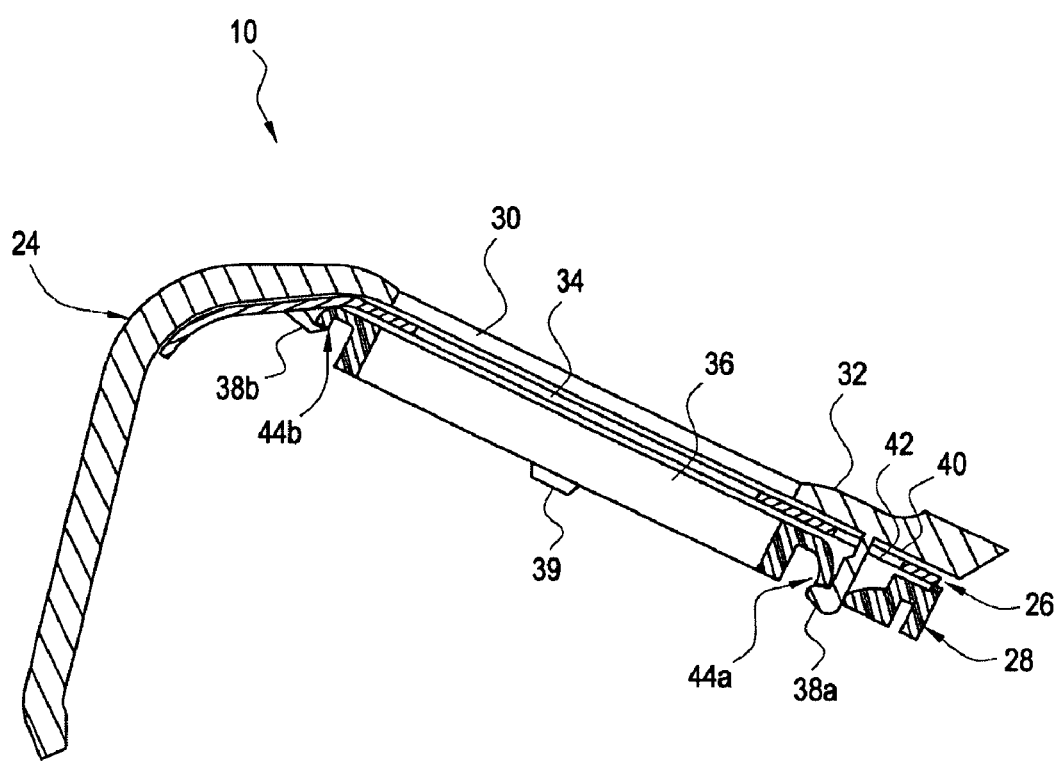
FIG. 3 is a cross-section of the finishing panel structure of FIG. 1.

As shown in FIGS. 2-3, the finishing panel structure 10 includes a trim panel 24, a deformable panel 26, and a retainer bracket 28 that is configured and arranged to secure the deformable panel 26 with respect to the trim panel 24. The deformable panel 26 conceals the striker 22 when the trunk lid 18 is in the open position, and is able to deform in response to engagement by the latch 20 when the trunk lid 18 is in the closed position.

The trim panel 24 is provided on the interior of the automobile 12 adjacent to and downward from the trunk opening 16. A panel opening 30 is formed through an upwardly-facing surface 32 of the trim panel 24. The panel opening 30 is configured and arranged to allow the latch 20 to pass through it when the trunk lid 18 is in the closed position. So that the latch 20 can also pass through the deformable panel 26 and the retainer bracket 28 when the trunk, lid 18 is in the closed position, a latch opening 34 is formed through the deformable panel 26, and a bracket opening 36 is formed through the retainer bracket 28. The panel opening 30 of the trim panel 24, the latch opening 34 of the deformable panel 26, and the bracket opening 36 of the retainer bracket 28 are substantially aligned.

In order to connect the deformable panel 26 and the retainer bracket 28 to the trim panel 24, a plurality of engaging structures 38a, 38b are formed on the trim panel 24. The engaging structures 38a, 38b are disposed on a downwardly-facing surface 40 of the trim panel 24 and are arranged around and adjacent to the panel opening 30. The engaging structures 38a, 38b of the trim panel 24 are adapted to engage a plurality of engaging structures 44a, 44b of the retainer bracket 28 so that the retainer bracket 28 clamps the deformable panel 26 in place with respect to the him panel 24. Furthermore, the engaging structures 44a, 44b can be adapted to extend through the deformable panel 26. In order to align the deformable panel 26 and the retainer bracket 28 with respect to the trim panel 24, a plurality of alignment posts 39 can be formed on the trim panel 24, and extend from the trim panel 24 for engagement with the deformable panel 26 and the retainer bracket 28.

Figure 4:
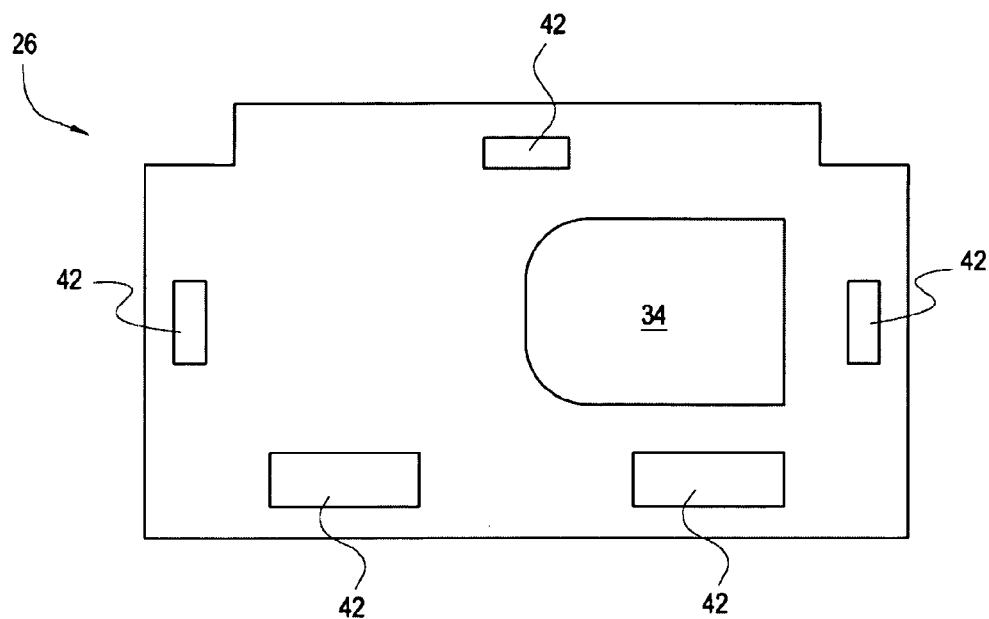
FIG. 4 is a top view showing a deformable panel of the finishing panel structure, of FIG. 1.

As shown in FIG. 4, the deformable panel 26 can be a substantially planar member and can be fabricated from a thin sheet material, such as rubber. A plurality of mounting apertures 42 are formed through the deformable panel 26 and are arranged around the latch opening 34 of the deformable panel 26 in locations corresponding to the engaging structures 38a, 38b and the alignment posts 39 of the trim panel 24. Accordingly, the deformable panel 26 could be mounted with respect to the trim panel 24 by placing the deformable panel 26 over the engaging structures 38a, 38b so that one or more of the engaging structures 38a, 38b extends through a respective mounting aperture 42 of the deformable panel 26.

Figure 5:
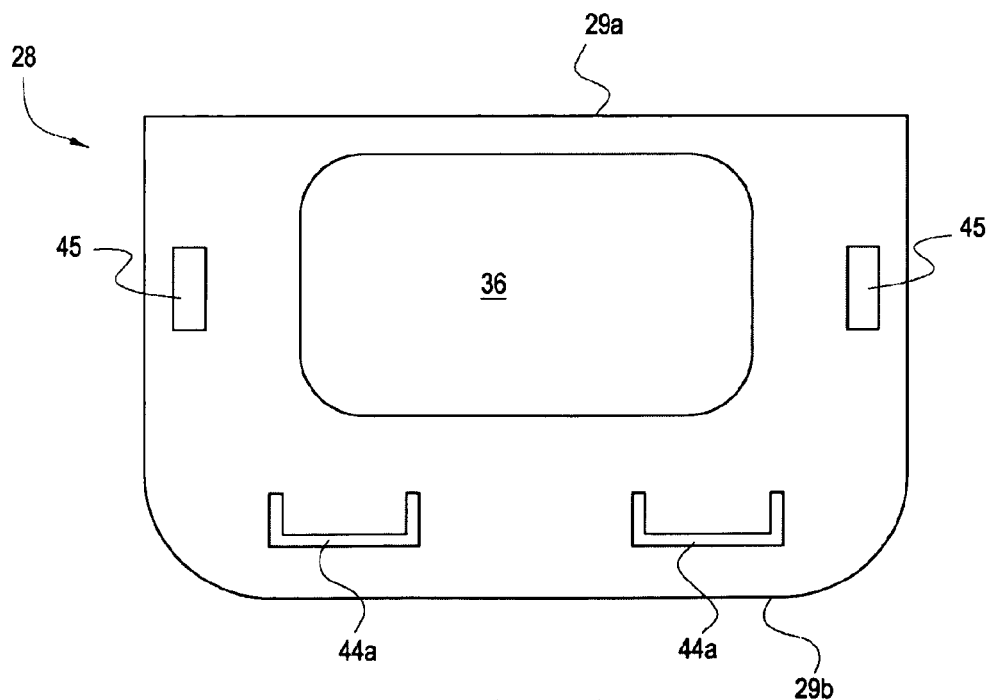
FIG. 5 is a top view of a retainer bracket of the finishing panel structure of FIG. 1.
Figure 6:
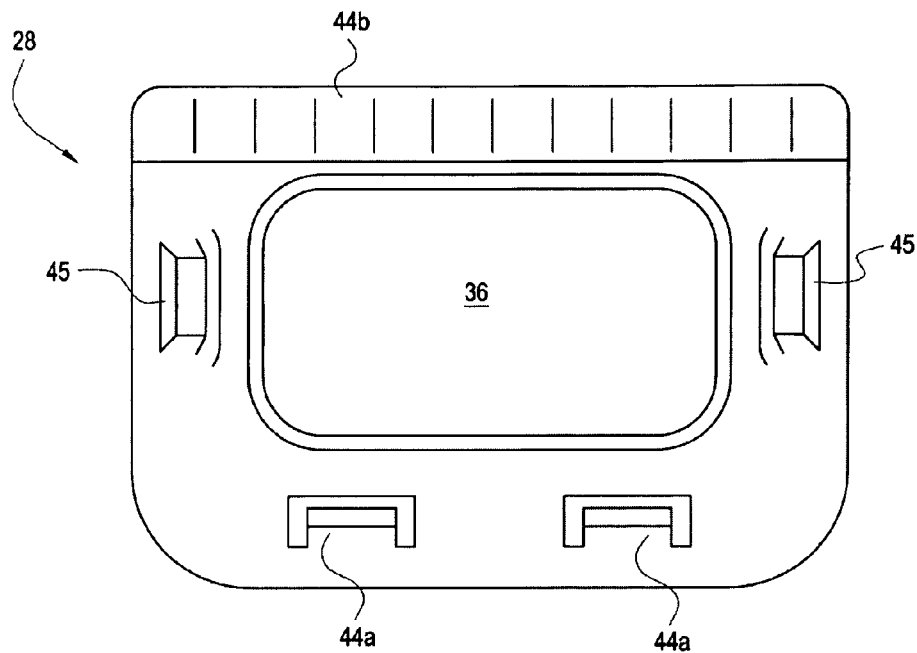
FIG. 6 is a bottom view of the retainer bracket of the finishing panel structure of FIG. 1.

As shown in FIGS. 5-6, the retainer bracket 28 extends from a first peripheral edge 29a to a second peripheral edge 29b. The engaging structures 44a, 44b of the retainer bracket 28 are arranged around the bracket opening 36 in locations corresponding to the locations of the engaging structures 38a, 38b of the trim panel 24. The engaging structures 44a, 44b of the retainer bracket 28 are configured and arranged to releasably connect the retainer bracket 28 to the trim panel 24 by engagement with the engaging structures 38a, 38b of the trim panel 24. For example, the engaging structures 38a, 38b of the trim panel 24 could extend partially or completely through the engaging structures 44a, 44b of the retainer bracket 28. The retainer bracket 28 can also include alignment apertures 45 that are formed through die retainer bracket 29 in locations corresponding to the alignment posts 39 of the retainer bracket 28. The alignment posts 39 and alignment apertures 45 are complementarity configured to engage one another by a slip fit or a friction fit, to aid alignment of the retainer bracket 28 with respect to the trim panel 24 without significantly increasing the force, required to install the retainer bracket 28 with respect to the trim panel 24. While the retainer bracket 28 is shown and described herein as being formed separately from the trim panel 24, it should be noted that the retainer bracket 28 could be formed integrally with die trim panel 24, for example, by forming an integral resilient hinge (not shown) between the trim panel 24 and the retainer bracket 28 to permit pivotal motion of the retainer bracket 28 with respect to the trim panel 24.

The engaging structures 38a, 38b of the trim panel 24 and the engaging structures 44a, 44b of the retainer bracket 28 can be any structure suitable to connect to the retainer bracket 28 to the trim panel 24 without performing a melting operation, a sonic welding operation, or other similar operations. Thus, by providing the engaging structures 38a, 38b on the trim panel 24 and the engaging structures 44a, 44b on the retainer bracket 28, the deformable panel 26 can be installed with respect to the trim panel 24 without the need to provide a separate workstation and machine for melting or welding the deformable panel 26 in place with respect to the trim panel 24. For example, in the embodiment shown in the attached figures, the engaging structures 38a of the trim panel 24 are projections, and the engaging structures 44a of the retainer bracket 28 include bracket apertures that are located adjacent to the second peripheral edge 29b of the retainer bracket 28, where the engaging structures 38a of the trim panel 24 are adapted to extend through the engaging structures 44a of the retainer bracket 28 and resiliently engage the retainer bracket adjacent to the engaging structures 44a of the retainer bracket 28. As another example, in die embodiment shown in the figures, the engaging structures 38b of the trim panel 24 are resilient hooks and engaging structures 44b are one or more tapered edges that are provided on the first peripheral edge 29a of the retainer bracket 28, wherein the tapered edges provided by the engaging structures 44b are configured and arranged to engage the resilient hooks of the engaging structures 38b so that the engaging structures 38b of the trim panel 24 and the engaging structures 44b of the retainer bracket 28 resiliently engage one another to retain the deformable panel 26 between the retainer bracket 28 and the trim panel 24. Of course, the engaging structures 38a, 38b of the trim panel 24 and the engaging structures 44a, 44b of the retainer bracket 28 could also resiliently disengage one another to allow the retainer bracket 28 to be released from the trim panel 24. Additionally, all of the above-described exampled could be reversed, so that the structures described in connection with the engaging structures 38a, 38b of the trim panel 24 could be provided as the engaging structures 44a, 44b of the retainer bracket 28 and vice-versa. Furthermore, in addition to or in lieu of a snap fit, a friction fit, or resilient engagement, the engaging structures 38a, 38b, 44a, 44b could include or comprise other conventional fastening means, such as glue, hook and loop fasteners, snaps, etc.

Figure 7A:
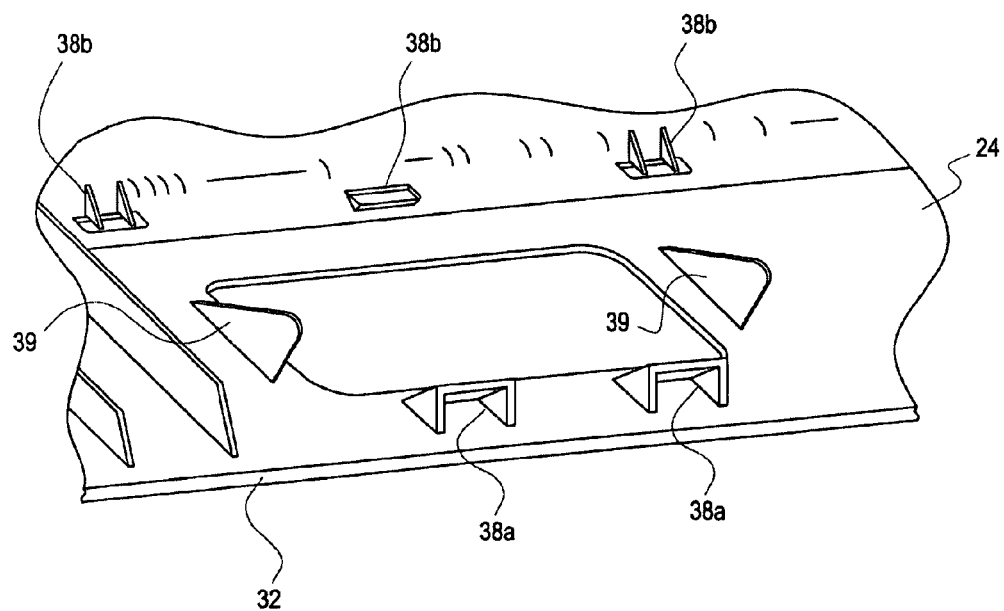
FIG. 7A is a detail view showing a trim panel of the finishing panel structure of FIG. 1 prior to installation of the deformable panel thereon.
Figure 7B:
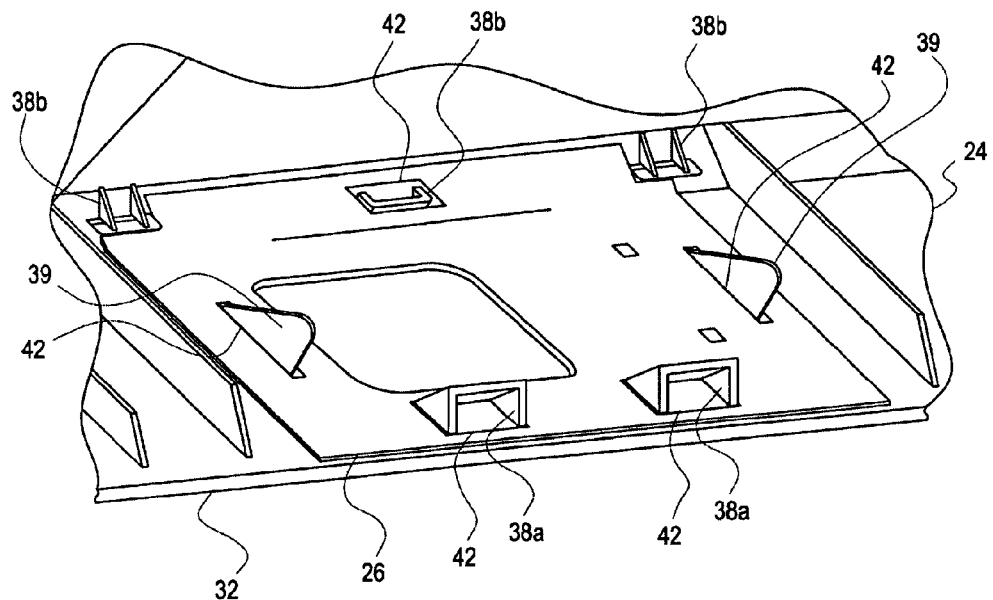
FIG. 7B is a detail view showing the deformable panel installed on the trim panel prior to installation of the retainer bracket.
Figure 7C:
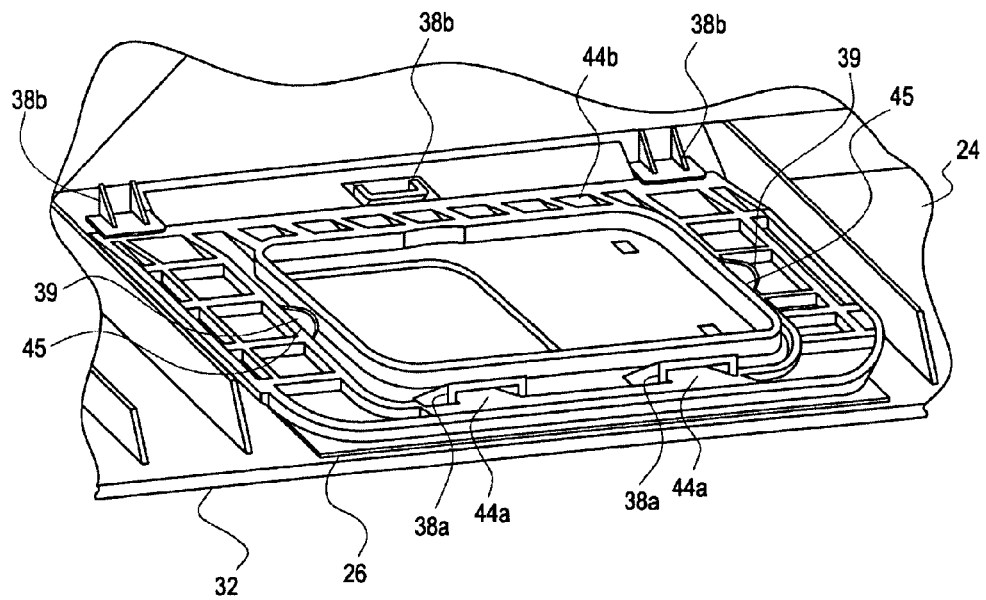
FIG. 7C is a detail view showing the retainer bracket in an installed position with respect to the deformable panel and the trim panel.

The finishing panel structure 10 is assembled by first providing the trim panel 24, as shown in FIG. 7A. Next, the deformable panel 26 is engaged with the trim panel 24 so that at least one of the engaging structures 38a, 38b of the trim panel 24 or at least one of the engaging structures 44a, 44b of the retainer bracket 28 extends through one of the mounting apertures 42 of the deformable panel 26. Thus, the deformable panel 26 at least partially covers the panel opening 30 of the trim panel 24 while, at the same time, the latch opening 34 of the deformable panel 26 is substantially aligned with the panel opening 30 of the trim panel 24. Next, the bracket opening 36 of the retainer bracket 28 is aligned with the panel opening 30 of the trim panel 24 and the latch opening 34 of the deformable panel 26. To secure the retainer bracket 28 to the trim panel 24, the engaging structures 44a, 44b of the retainer bracket 28 are brought into engagement with the engaging structures 38a, 38b of the trim panel 24 to releasably connect the retainer bracket 28 to the trim panel 24.

With the finishing panel structure 10 in place in the automobile 12, the striker 22 can be substantially concealed by the deformable panel 26 when the trunk lid 18 is in the open position. Furthermore, when the trunk lid 18 is in the closed position, the latch 20 of the trunk lid 18 can extend through the panel opening 30 of the trim panel 24, the latch opening 34 of the deformable panel 26, and the bracket opening 36 of the retainer bracket 28, and engagement of the latch 20 with the deformable panel 26 can slightly deform the deformable panel 26.

While the invention has been described in connection with what is presently considered to be the most practical and preferred embodiment, it is to be understood that the invention is not to be limited to the disclosed embodiments but, on the contrary, is intended to cover various modifications and equivalent arrangements included within die spirit and scope of the appended claims, which scope is to be accorded the broadest interpretation so as to encompass all such modifications and equivalent structures as is permitted under the law.

What is claimed is:

1. A finishing panel structure for an automobile, comprising;
    a trim panel that is connectable to the automobile, the trim panel defining a panel opening;
    a deformable panel that at least partially covers the panel opening, the deformable panel defining a latch opening and at least one mounting aperture proximate to the latch opening;
    a retainer bracket defining a retainer bracket opening;
    at least one projection extending from one of the trim panel or the retainer bracket, the projection extending through the mounting aperture of the deformable panel; and
    at least one engaging structure formed on the other of the trim panel or the retainer bracket to engage the projection.

2. The finishing panel structure of claim 1, wherein the projection and the engaging structure resiliently engage one another to retain the deformable panel between the retainer bracket and the trim panel.

3. The finishing panel structure of claim 1, wherein the projection and the engaging structure releasably connect the retainer bracket to the trim panel.

4. The finishing panel structure of claim 1, wherein the deformable panel is fabricated from rubber.

5. The finishing panel structure of claim 1, further comprising:
    at least one hook extending from the trim panel; and
    the retainer bracket having a first peripheral edge that engages the hook.

6. The finishing panel structure of claim 5, further comprising:
    the retainer bracket having a second peripheral edge opposite the first peripheral edge, wherein the engaging structure is disposed on the retainer bracket adjacent to the second peripheral edge.

7. The finishing panel structure of claim 5, further comprising:
    the retainer bracket having a second peripheral edge opposite the first peripheral edge, wherein the projection is disposed on the retainer bracket adjacent to the second peripheral edge.

8. The finishing panel structure of claim 1, further comprising:
    at least one alignment aperture formed in the retainer bracket; and
    at least one alignment post extending from the trim panel, the alignment post is configured and arranged to extend through the alignment aperture to align the retainer bracket with respect to the trim panel.

9. A finishing panel structure for an automobile having a body having a striker and a trunk lid having a hatch, the trunk lid moveable with respect to the body between an open position, where the latch is spaced from the striker and a closed position where the latch is engaged with the striker, the finishing panel structure comprising:
    a trim panel that is connectable to the body of the automobile, the trim panel defining a panel opening;
    a deformable panel that at least partially covers die panel opening, the deformable panel defining a latch opening and at least one mounting aperture proximate to the latch opening;
    a retainer bracket defining a retainer bracket opening;
    at least one projection extending from one of the trim panel or the retainer bracket, wherein the projection extends through the mounting aperture of the deformable panel; and
    at least one engaging structure formed, on the other of the trim panel or the retainer bracket to engage the projection,
    wherein the latch extends through the panel opening, the latch opening and the bracket opening when the trunk lid is in the closed position.

10. The finishing panel structure of claim 9, further comprising:
    the projection and the engaging structure resiliently engage one another to retain the deformable panel between the retainer bracket and the trim panel.

11. The finishing panel structure of claim 9, wherein the deformable panel is fabricated from rubber.

12. The finishing panel structure of claim 9, wherein the deformable panel deforms in response to engagement of the latch with the deformable panel when the trunk lid is in the closed position.

13. The finishing panel structure of claim 12, further comprising:
    at least one hook extending from the trim panel; and
    the retainer bracket having a first peripheral edge that engages the at least one hook.

14. The finishing panel structure of claim 13, further comprising:
    the retainer bracket having a second peripheral edge opposite the first peripheral edge, wherein the engaging structure is disposed on the retainer bracket adjacent to the second peripheral edge.

15. The finishing panel structure of claim 13, further comprising:
    the retainer bracket having a second peripheral edge opposite the first peripheral edge, wherein the projection is disposed on the retainer bracket adjacent to the second peripheral edge.

16. The finishing panel structure of claim 9, further comprising:
    at least one alignment post extending from the trim panel;
    at least one panel alignment aperture formed through the deformable panel, wherein the alignment post extends through the panel alignment aperture to align the deformable panel with respect to the trim panel; and
    at least one bracket alignment aperture formed through the retainer bracket, wherein the alignment post extends through the bracket alignment aperture to align the retainer bracket with respect to the trim panel.

17. The finishing panel structure of claim 9, further comprising:

the projection including a post that is connected to the trim panel; and the engaging structure including a bracket aperture that extends through the retainer bracket, wherein the post is configured and arranged to extend through the bracket aperture and engage the retainer bracket adjacent to the bracket aperture.

18. A finishing panel structure for an automobile having a body having a striker and a trunk lid having a hatch, die trunk lid moveable with respect to the body between an open position, where the latch is spaced from the striker and a closed position where the latch is engaged with the striker, the finishing panel structure comprising:

a trim panel that is connectable to the body of the automobile, the trim panel defining a panel opening;

a deformable panel that is fabricated from rubber and at least partially covers the panel opening, the deformable panel defining a latch opening and at least one mounting aperture proximate to the latch opening;

a retainer bracket defining a retainer bracket opening;

at least one projection extending from one of the trim panel or the retainer bracket, wherein the projection extends through the mounting aperture of die deformable panel;

at least one engaging structure formed on the other of the trim panel or the retainer bracket to engage the projection, wherein engagement of the engaging structure and the projection retains the deformable panel between the retainer bracket and the trim panel;

at least one hook extending from the trim panel;

the retainer bracket having a first peripheral edge that engages the at least one hook;

at least one alignment post extending from the trim panel;

at least one panel alignment aperture formed through the deformable panel, wherein the alignment post extends through the panel alignment aperture to align the deformable panel with respect to the trim panel; and at least one bracket alignment aperture formed through the retainer bracket, wherein the alignment post extends through the bracket alignment aperture to align the retainer bracket with respect to the trim panel, wherein the latch extends through the panel opening, the latch opening and the bracket opening when the trunk lid is in the closed position.

19. The finishing panel structure of claim 18, further comprising:

the retainer bracket having a second peripheral edge opposite the first peripheral edge, wherein the engaging structure is disposed on the retainer bracket adjacent to the second peripheral edge.

20. The finishing panel structure of claim 18, further comprising:

the retainer bracket having a second peripheral edge opposite the first peripheral edge, wherein the projection is disposed on the retainer bracket adjacent to the second peripheral edge.

* * * * *